March 23, 1965   B. R. SELZ   3,174,813
UNIVERSAL JOINT SEAL
Filed June 18, 1962

3,174,813
UNIVERSAL JOINT SEAL
Bernard R. Selz, Monroe County, Mich., assignor to Dana Corporation, Toledo, Ohio, a corporation of Virginia
Filed June 18, 1962, Ser. No. 203,345
4 Claims. (Cl. 308—187.2)

This invention relates to seals in general and more particularly to a seal for use with a Cardan type universal joint for sealing the junction between the trunnion of the journal cross and the trunnion bearing race rotatably mounting the journal cross.

Trunnion to bearing seals are well known in the art and are provided to insure that the lubricant within the bearing race rotatably positioned on the trunnion will not be expelled therefrom and that foreign contaminants may not enter the bearing race to interfere with the proper lubrication thereof. This sealing is of prime importance, for universal joints are often used under adverse conditions where they are exposed to the elements and, therefore, subject to contamination. To avoid this contamination or loss of lubrication, a seal engaging the trunnion and the open end of the bearing race is provided.

The prior art seals take the form of an annular element normally prepared from an elastomeric material which through its resiliency maintains its engagement with the trunnion and bearing. However, such resilient material does not often have sufficient elasticity to insure a secure engagement with the trunnion and bearing. Further, since the seals are exposed to the elements, they normally deteriorate and lose their resiliency so that the engagement becomes less secure after service use.

Prior art seals have incorporated, in conjunction with the elastomeric element, support means to add additional strength and shape retaining properties to the seal. These support means have taken the form of annular metallic elements surrounding or imbedded in the elastomeric element. These support means, however, do not operate satisfactorily under all conditions. The main deficiency is that upon being struck with a blow or when subjected to an interference fit on either the trunnion or the bearing they become deformed and do not properly perform their function of securing the engagement between the elastomeric portion and the bearing race and trunnion.

It is, therefore, an object of this invention to provide means for sealing the junction of a trunnion and bearing race which means includes an elastomeric sealing element and a support element to insure the continuous function thereof.

It is another object of this invention to provide a bearing race-to-trunnion-seal means for insuring that the seal remains in proper engagement with the trunnion and bearing.

It is yet another object of this invention to provide a support element for the elastomeric element of a trunnion and bearing race seal which support element will insure the proper engagement of the elastomeric element with the trunnion and bearing race and also protect the same from inadvertent blows and insure that even after deterioration from the action of the elements the seal will perform its function satisfactorily.

It is yet a still further object of this invention to provide means for sealing a trunnion to bearing which means includes an elastomeric element engaging the trunnion and bearing and a resilient support element adapted to insure the continued engagement of the elastomeric element with the trunnion and bearing.

These and other objects will become apparent from a consideration of the following specification when taken in view of the drawings wherein.

Figure 1:
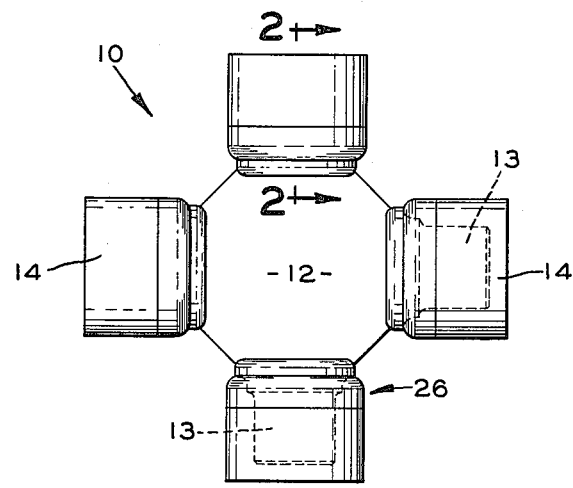
FIG. 1 is a plan view of a journal, bearing race and seal assembly.
Figure 2:
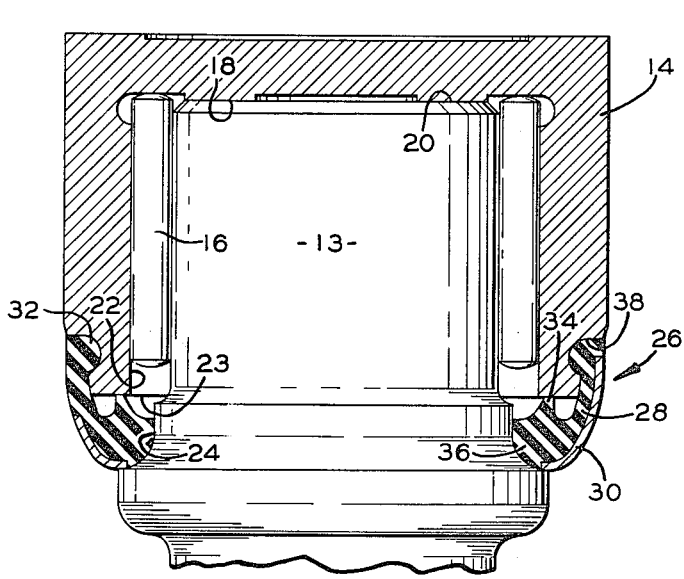
FIG. 2 is a cross sectional view of one of the trunnions and bearing races of the journal cross assembly taken along the lines 2—2 of FIG. 1.
Figure 3:
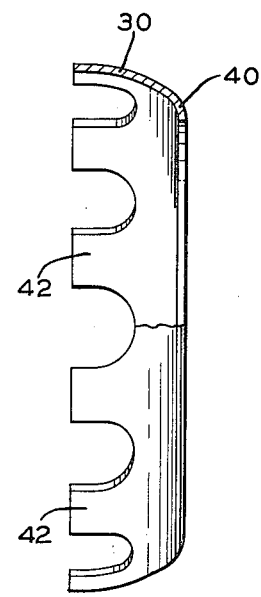
FIG. 3 is an elevational view with portions broken away of the resilient supporting element incorporated in the sealing means of this invention.

In a preferred embodiment of this invention a journal cross having a plurality of annular trunnions extending radially therefrom is provided with an annular bearing race rotatably mounted on each trunnion. Interposed between the trunnion and the race are a plurality of needle bearings to insure substantially frictionless engagement therebetween. An annular seal is provided to seal the junction of the open end of the bearing race and the trunnion. More particularly, the seal is provided with a plurality of integral lips, some of the lips engaging the bearing while the other lip engages the trunnion. This portion of the seal is formed of an elastomeric compound which in itself is resilient in nature. The seal also includes an annular support element in the form of a ring having a plurality of fingers or leaves extending radially therefrom. The support element is preferably formed from a material having spring-like characteristics so that the annular portion and the leaf portions have a very high yield strength and function as springs. In this manner the seal is adapted to resist loads while elastically deforming and, in addition, by dimensioning the seal properly, the same may be placed under a preload in the assembled condition so that upon wear or deterioration of the elastomeric portion, the support element will insure that the engagement thereof with the trunnion and the bearing race will remain secure.

Referring now to the drawings, a journal cross and bearing race assembly shown generally at 10 includes a journal cross 12 having two pairs of opposed trunnions 13 extending therefrom in a co-planar relationship, which trunnions are equally and evenly spaced relative to each other, and each has rotatably mounted thereon a bearing race 14. The bearing races 14 are substantially cup-shaped and of a sufficient diameter so that a plurality of needle bearings 16 may be interposed between the inner diameter thereof and the outer diameter of the trunnion 13.

The radially outer internal face 18 of the bearing cup 14 is adapted to abut the radially outer end 20 of the trunnion 13 and serve as a thrust surface therebetween. In this manner the bearing races 14 are suitably rotatably mounted on the trunnions 13 of the journal cross 12.

Each bearing race 14 has an open end 22 defining a radially inner face 23 which is disposed adjacent an arcuate shoulder 24 on the trunnion 13 and spaced therefrom. A sealing means shown generally at 26 is adapted to engage the bearing race 14 and the shoulder 24 on the journal cross 13 thereby sealingly interconnecting the same. The sealing means 26 includes an elastomeric element 28 and a resilient supporting element 30.

The elastomeric element 28 is formed with three integral lips 32, 34 and 36; the lip 32 engaging a groove 38 formed in the periphery of the bearing race 14, the lip 34 engaging the end face 23 of the bearing race 14 while the lip 36 engages the shoulder 24 of the trunnion 13.

The elastomeric element 28 is preferably formed integrally with the supporting element 30 for ease of assembly, as by molding the same thereto, or the support means 30 may be formed separately from the elastomeric element 28 and mechanically secured or bonded thereto.

The support element 30 includes an annular cup-shaped base portion 40 having a plurality of fingers 42 formed integrally therewith and extending therefrom. The fingers 42 bias the elastomeric element 28 in the area of the lip 32 and secures the same in the groove 38 in the bearing race 14, while the annular base portion 40 secures the lip 36 against the shoulder 24 of the trunnion 13 and the lip 34 against the end 23 of the bearing race 14. The support element 30 is preferably formed from a material having spring-like characteristics with a relatively high yield point such as metal or certain plastics so that the same will securely bias the elastomeric element 28 into proper engagement with the bearing race 14 and trunnion 13 irrespective of the wear thereof or deterioration thereof due to the action of the elements. Further, upon assembly, the dimensions of the support element 30 are such that the same securely biases the lips 32, 34 and 36 against the respective portions of the bearing race 14 and trunnion 13.

In this manner if the sealing means 26 is inadvertently subjected to a blow or impact load, the same will resiliently absorb the same and not be deformed thereby and continue to satisfactorily seal the junction between the bearing race 14 and the trunnion 13.

If desired, the support element 30 may be disposed within the elastomeric element 28 or disposed on the external surface thereof provided that there is always a sufficient amount of the elastic element positioned internally of the support element to provide satisfactory sealing of the junction between the trunnion 13 and bearing race 14.

From the foregoing it is apparent that means have been provided for sealing the junction of a trunnion and bearing race which means includes an elastomeric sealing element and a supporting element to insure the continuous function thereof; which supporting element insures that the seal remains in proper engagement with the trunnion and bearing; and which supporting element provides for the proper engagement of the elastomeric element with the trunnion and bearing race and protects the same from inadvertent blows and insures that even after deterioration from the action of the elements the seal will perform its function satisfactorily.

One preferred embodiment of this invention has been shown and described, but it is apparent that many changes may be made in the structure thereof without departing from the basic concept of this invention as defined by the following claims.

What is claimed is:

1. The combination with a journal trunnion having a bearing race rotatably disposed thereon of a sealing means including an annular elastomeric element having portions engaging the external periphery of said bearing race and of said trunnion and a metallic supporting element for said elastomeric element and having spring-like characteristics and including an annular base and integral fingered portions biasing said elastomeric portions radially inwardly into preloaded engagement with said bearing race and trunnion.

2. The combination with a cylindrical journal trunnion having an annular bearing race rotatably disposed thereon of a sealing means including an annular elastomeric element having portions engaging the external periphery of said bearing race and of said trunnion and a metallic supporting element having spring-like characteristics, said supporting element including an annular portion surrounding said trunnion and biasing a portion of said elastomeric element radially inwardly into radial preloaded engagement therewith and a plurality of fingers formed integrally with said annular portion and extending radially therefrom and biasing another portion of said elastomeric element radially inwardly into preloaded engagement with the external periphery of said bearing race.

3. The combination with a cylindrical journal trunnion and an annular cup-shaped bearing race rotatably disposed thereon, said bearing race having a closed outer end and an open inner end with a radially extending space between said bearing race and said trunnion at the inner end of said bearing race, of a sealing means for sealing said space, said sealing means including an annular elastomeric element surrounding said trunnion and having a first portion engaging said trunnion and a second portion engaging the exteral peripheral surface of said bearing race adjacent the inner end thereof and an annular support element including a base portion and a plurality of fingers formed integrally with said base portion and extending radially therefrom, characterized in that said support element is made from a metal having spring-like characteristics, said base portion biases said first portion of said elastomeric element radially inwardly into preloaded engagement with said trunnion and said fingers bias said second portion radially inwardly into preloaded engagement with the external peripheral surface of said bearing race.

4. The combination with a cylindrical journal trunnion having an annular cup-shaped bearing race rotatably disposed thereon, said bearing race having a closed outer end and an open inner end with a radially extending space between said bearing race and said trunnion at the inner end of said bearing race, and bearing means disposed between said bearing race and trunnion and spaced outwardly from the inner end of said bearing race, of a sealing means for sealing said space, said sealing means including an annular elastomeric element surrounding said trunnion and having first, second and third integral annular lips, said first lip engaging the external peripheral surface of said bearing race adjacent the inner end thereof, said second lip engaging the inner end of said bearing race, and said third lip engaging said trunnion, and an annular support element for said elastomeric element including an annular base portion and a plurality of fingers formed integrally with said base portion and extending radially outwardly therefrom and overlying the external peripheral surface of said bearing race, characterized in that said supporting element is made from a metal having spring-like characteristics for supporting, biasing and protecting said elastomeric element and biases said first lip radially inwardly into preloaded engagement with the external periphery of said bearing race, said second lip into preloaded engagement with the inner end of said bearing race and said third lip radially inwardly into preloaded engagement with said trunnion.

References Cited in the file of this patent

UNITED STATES PATENTS

| | | |
|---|---|---|
| 2,427,449 | Dunn | Sept. 16, 1947 |
| 2,755,113 | Baumheckel | July 17, 1956 |
| 2,764,433 | Cobb | Sept. 25, 1956 |
| 2,794,693 | Burkhalter | June 4, 1957 |

FOREIGN PATENTS

| | | |
|---|---|---|
| 825,348 | Great Britain | Dec. 16, 1959 |